US011847838B2

(12) United States Patent
Kuriyama

(10) Patent No.: US 11,847,838 B2
(45) Date of Patent: Dec. 19, 2023

(54) RECOGNITION DEVICE

(71) Applicant: Hitachi Automotive Systems, Ltd., Hitachinaka (JP)

(72) Inventor: Akira Kuriyama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 288 days.

(21) Appl. No.: 17/263,736

(22) PCT Filed: Sep. 4, 2019

(86) PCT No.: PCT/JP2019/034693
§ 371 (c)(1),
(2) Date: Jan. 27, 2021

(87) PCT Pub. No.: WO2020/066505
PCT Pub. Date: Apr. 2, 2020

(65) Prior Publication Data
US 2021/0182576 A1    Jun. 17, 2021

(30) Foreign Application Priority Data

Sep. 25, 2018  (JP) ................. 2018-179290

(51) Int. Cl.
  G06V 20/56    (2022.01)
  H04W 4/40     (2018.01)
  G06V 20/58    (2022.01)
(52) U.S. Cl.
  CPC .......... G06V 20/588 (2022.01); G06V 20/584 (2022.01); H04W 4/40 (2018.02)
(58) Field of Classification Search
  CPC ..... G06V 20/588; G06V 20/584; H04W 4/40; G08G 1/096791; G08G 1/162; G08G 1/096725
  See application file for complete search history.

(56) References Cited

U.S. PATENT DOCUMENTS

2010/0332127 A1* 12/2010 Imai ................. B60W 30/12
                                              701/532
2011/0135155 A1   6/2011 Kudo
(Continued)

FOREIGN PATENT DOCUMENTS

JP    2006-151014    *   6/2006
JP    2006-151014 A      6/2006
(Continued)

OTHER PUBLICATIONS

International Search Report (PCT/ISA/210) issued in PCT Application No. PCT/JP2019/034693 dated Nov. 19, 2019 with English translation (four (4) pages).
(Continued)

Primary Examiner — Md K Talukder
(74) Attorney, Agent, or Firm — Crowell & Moring LLP

(57) ABSTRACT

Provided is a recognition device that can accurately recognize a position where a vehicle is to be stopped. The recognition device according to the present invention includes: a distance calculation unit 210 that calculates a map information distance between a host vehicle and a target feature based on map information; a stop line detection processing unit 130a that, in a case where the map information distance is equal to or less than a determination value, sets a detection area for detection of the target feature based on the map information distance, detects the target feature within the detection area, and calculates an actually-measured distance between the host vehicle and the target feature; and a stop line position unifying unit 310 that unifies data of the map information distance and data of the actually-measured distance to calculate a unification result of a distance between the host vehicle and the target feature.

7 Claims, 10 Drawing Sheets

(56) References Cited

U.S. PATENT DOCUMENTS

| | | | |
|---|---|---|---|
| 2017/0322557 A1* | 11/2017 | Fujita | B60W 60/001 |
| 2018/0286247 A1 | 10/2018 | Fujita | |
| 2019/0072674 A1* | 3/2019 | Otaki | G05D 1/0274 |
| 2019/0137287 A1* | 5/2019 | Pazhayampallil | G01C 21/34 |
| 2020/0019792 A1* | 1/2020 | Sano | G06T 7/70 |
| 2021/0182576 A1* | 6/2021 | Kuriyama | G06V 20/588 |
| 2021/0359747 A1* | 11/2021 | Islam | H04B 7/0404 |
| 2023/0017726 A1* | 1/2023 | Innami | G01C 21/3889 |

FOREIGN PATENT DOCUMENTS

| | | |
|---|---|---|
| JP | 2008-287572 A | 11/2008 |
| JP | 2009-196487 A | 9/2009 |
| JP | 2011-13039 A | 1/2011 |
| JP | 2011-123613 A | 6/2011 |
| JP | 2013-072793 A | 4/2013 |
| JP | 2013_159117 * | 8/2013 |
| JP | 2013-159117 A | 8/2013 |
| WO | WO 2017/056247 A1 | 4/2017 |

OTHER PUBLICATIONS

Japanese-language Written Opinion (PCT/ISA/237) issued in PCT Application No. PCT/JP2019/034693 dated Nov. 19, 2019 (three (3) pages).

* cited by examiner

RECOGNITION DEVICE

TECHNICAL FIELD

The present invention relates to a recognition device that recognizes a position at which a vehicle is to be stopped.

BACKGROUND ART

Development of autonomous driving technology is actively under way all over the world, and levels 1 to 5 defined by SAE (Society of Automotive Engineers) are often used as levels of automation. According to the definition of SAE, a system is responsible for vehicle control at level 3 or higher. Therefore, in order to realize level 3 or higher autonomous driving, not only vehicle control such as traveling according to a lane, but also vehicle control according to traffic regulations need to be performed on system responsibility.

One of the traffic regulations is to stop a vehicle just in front of a stop line. Therefore, a vehicle having a level 3 or higher autonomous driving function must have a function of obtaining relative position information between the stop line and the vehicle by some means.

PTL 1 discloses a technique for shifting to a stop line recognition mode based on a color of a traffic light. According to the technique of PTL 1, an image processing unit 4 recognizes a traffic light ahead on a host vehicle traveling lane and, in a case where the image processing unit 4 recognizes that the traffic light just in front of the host vehicle on the host vehicle traveling lane is located within a preset distance L2 and the color of the traffic light is red, shifts to the stop line recognition mode and executes stop line recognition processing. According to PTL 1, this can properly save unnecessary execution of the stop line recognition processing, thereby accurately recognizing a stop line necessary for control of the host vehicle 1 without causing an excessive computation load.

PTL 2 discloses a technique of a fixed point stop control method for a vehicle. According to the technique of PTL 2, a rear camera 101 or a front camera 102 is used to recognize markers on a road surface in all directions. Examples of the markers are a pedestrian crossing, a temporary stop line, and a pedestrian crossing notice. A kind of target recognized by the rear camera 101 or the front camera 102 and a distance to the target are calculated and sent to a locator unit 11. The locator unit 11 pinpoints the position where the vehicle is currently traveling. According to PTL 2, deceleration control is realized based on information generated by the locator unit 11 on the position where the host vehicle is currently traveling.

CITATION LIST

Patent Literature

PTL 1: JP 2011-123613 A
PTL 2: JP 2009-196487 A

SUMMARY OF INVENTION

Technical Problem

However, according to the technique for shifting to the stop line recognition mode described in PTL 1, there is a problem that the shift to the stop line recognition mode does not occur in a place where there is no traffic light. Positional accuracy of the locator information of PTL 2 may undesirably decrease since a traveling distance from a time of recognition of a target such as a marker sometimes becomes long.

The inventors newly found that stop line detection using a camera has the following problems.

(1) A road surface structure, such as an asphalt seam, that extends laterally with respect to a host vehicle driving lane is erroneously detected as a stop line.

(2) A faded stop line cannot be detected.

Furthermore, the inventors found that it is necessary to generate information for stopping a vehicle at a predetermined position even in a case where a stop line cannot be detected.

The present invention has been made in view of the above problems, and an object of the present invention is to provide a recognition device that can accurately recognize a position where a vehicle is to be stopped.

Solution to Problem

A typical example of the present invention is summarized as follows.

A recognition device according to the present disclosure includes: a first sensor that detects a first feature; and at least one information source different from the first sensor, in which an operation start time of the first sensor is determined based on operation start information output from the first sensor or the information source.

Advantageous Effects of Invention

An example obtained by the typical example of the present invention is briefly described as follows. According to the present invention, a position where a vehicle is to be stopped can be accurately recognized.

Additional features related to the present invention will become apparent from the specification and drawings. Furthermore, problems, configurations, and effects other than those described above will become apparent from the descriptions of embodiments below.

DESCRIPTION OF EMBODIMENTS

Best modes for carrying out the present invention will be described in detail below with reference to the drawings. In all of the drawings for explaining the embodiments for carrying out the invention, blocks or elements having identical functions are given identical reference signs, and repeated description thereof is omitted.

The embodiments below describe, as an example, a stop line detection system for detecting a position at which a vehicle is to be stopped by using an outside information detection sensor and controlling the vehicle to stop on system judgment and an autonomous driving system using the stop line detection system.

First Embodiment

Figure 1:
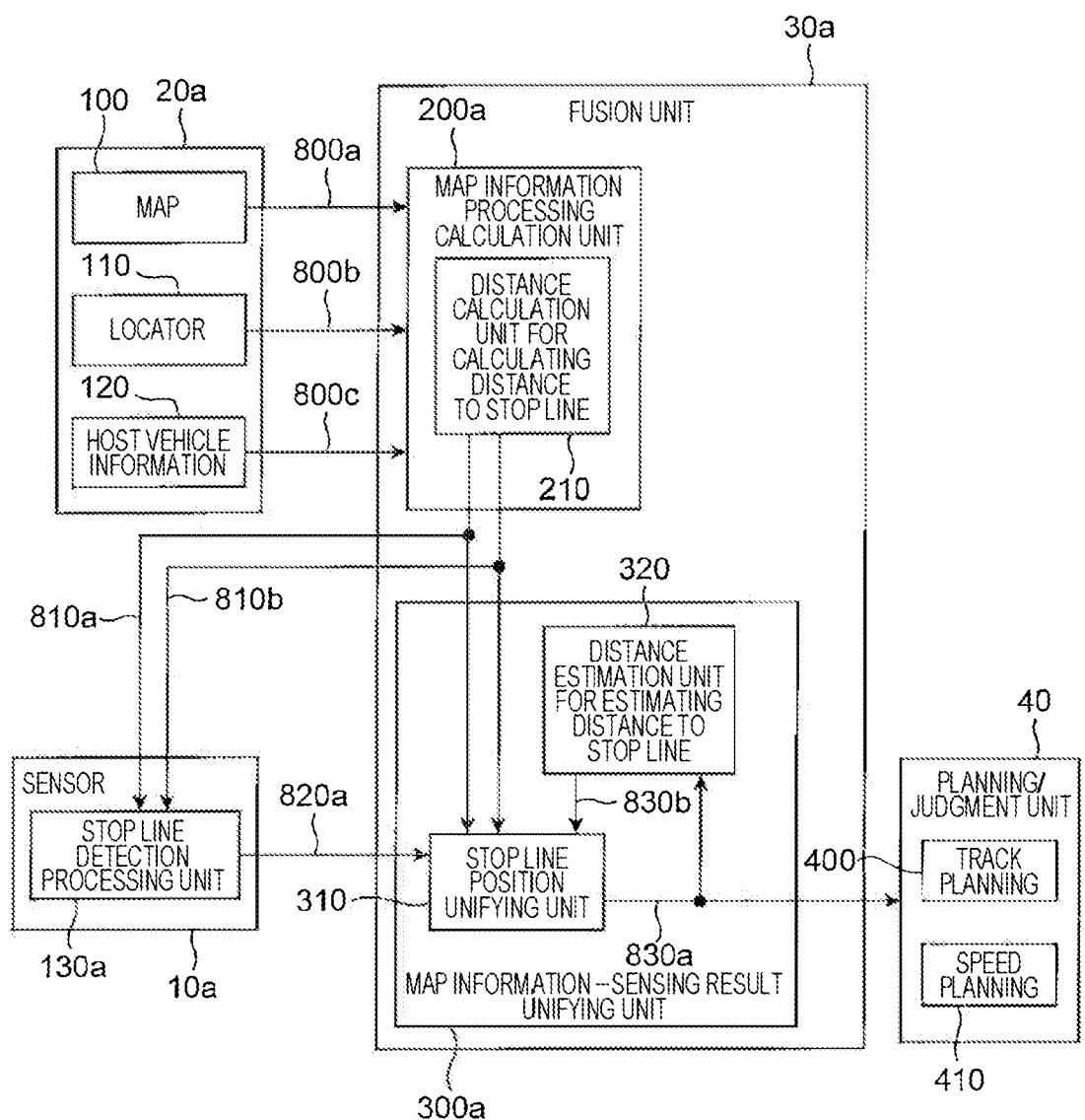
FIG. 1 is a functional block diagram of a stop line detection system and an autonomous driving method using the stop line detection system.
Figure 2:
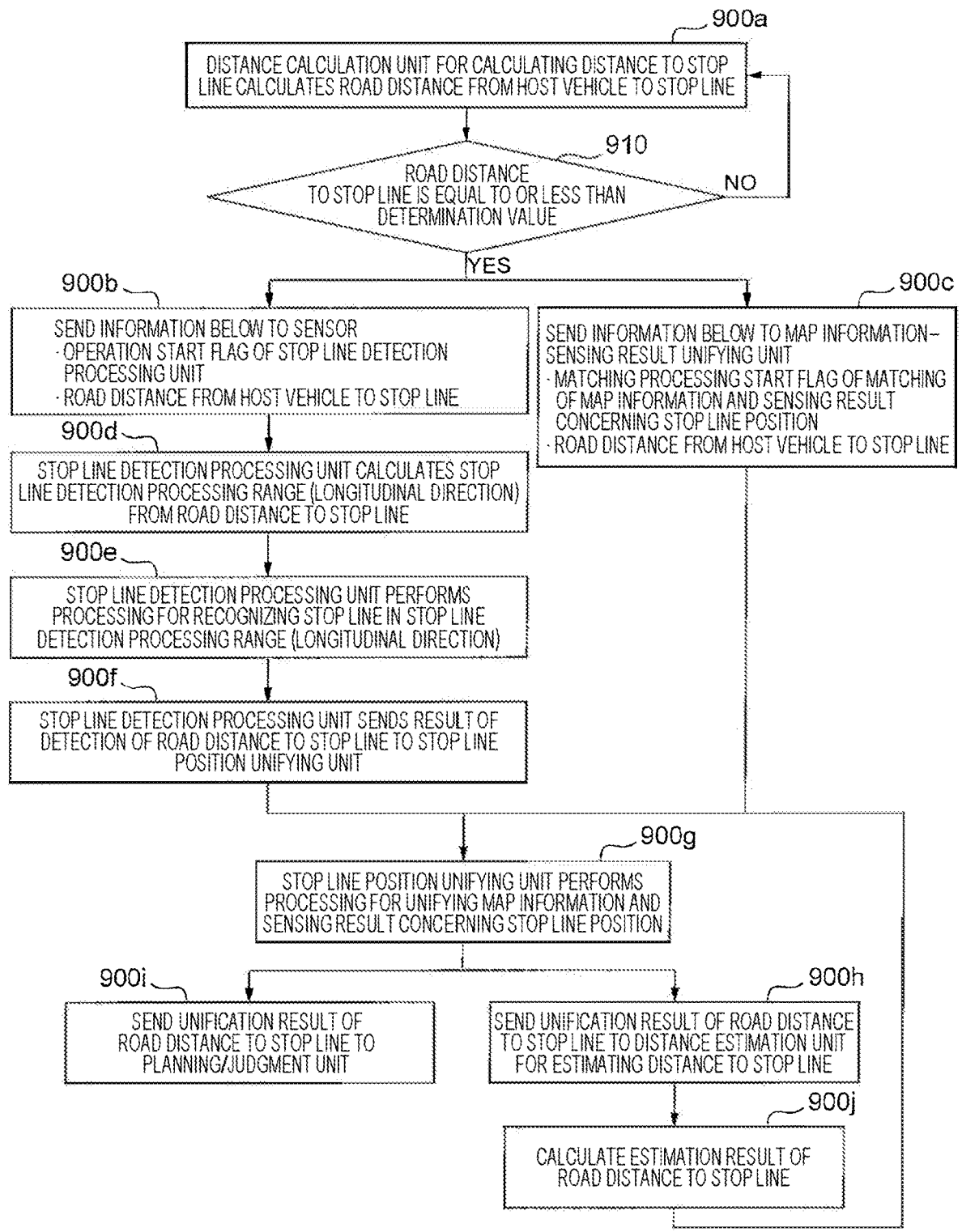
FIG. 2 is a signal processing flowchart of the stop line detection system and the autonomous driving method using the stop line detection system.
Figure 3:
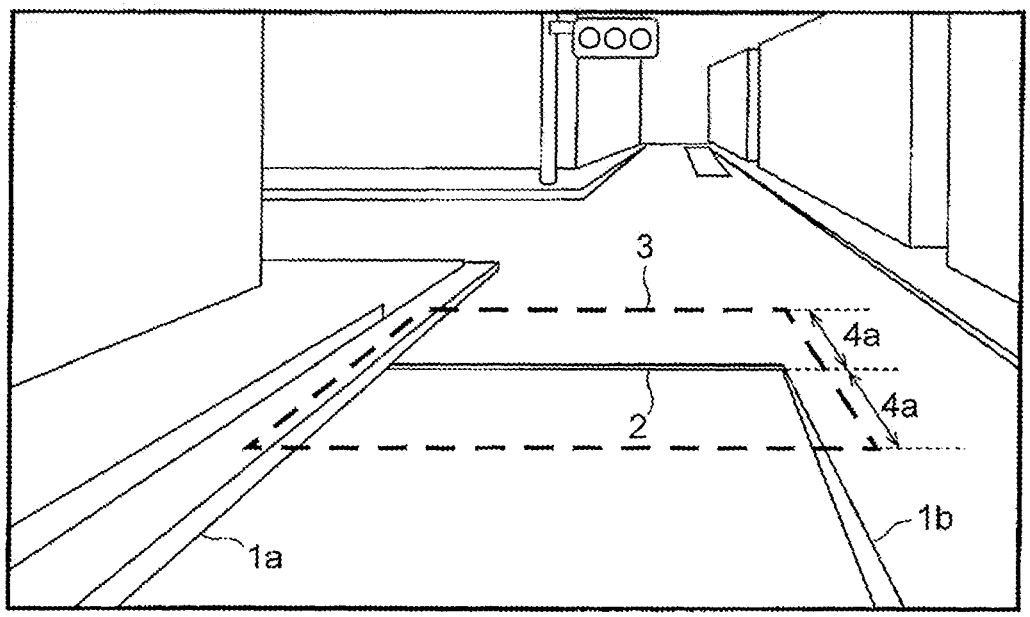
FIG. 3 illustrates a technical outline of the stop line detection system.

FIG. 1 is a functional block diagram of a stop line detection system according to the first embodiment and an autonomous driving method using the stop line detection system, and FIG. 2 is a flowchart of signal processing of the stop line detection system according to the first embodiment and the autonomous driving method using the stop line detection system. FIG. 3 illustrates a technical outline of the stop line detection system according to the first embodiment.

The stop line detection system has a sensor 10a, which is a first sensor, an information source 20a, which is a first information source, a fusion unit 30a, which is a first fusion unit, and a planning/judgment unit 40.

The sensor 10a is a sensor that detects a feature in front of a host vehicle and is attached to the host vehicle. The sensor 10a has a stop line detection processing unit 130a that detects a stop line 2 as a first feature. The stop line 2 is drawn on a road surface, and a rule requires vehicles to stop just in front of the stop line 2. The sensor 10a is preferably a camera (visible light, near infrared, far infrared) or LiDAR (Laser Imaging and Ranging), but is not limited to these, and may be, for example, a sensor of other kinds that can detect a stop line drawn on a road surface or a stop line formed as a three-dimensional structure on a road surface.

The information source 20a has, as one or more information sources different from the sensor 10a, a map information acquisition unit 100 that acquires map information, a locator 110 that acquires a position of the host vehicle, and a host vehicle information acquisition unit 120 that acquires information such as a direction in which the host vehicle is traveling and a vehicle speed.

The fusion unit 30a determines an operation start time of the sensor 10a based on operation start information output from the sensor 10a or the information source 20a, and has a map information processing calculation unit 200a that acquires and processes map information from the information source 20a and a map information-sensing result unifying unit 300a that unifies a calculation result of the map information processing calculation unit 200a and a processing result of the stop line detection processing unit 130a of the sensor 10a. The map information processing calculation unit 200a has a distance calculation unit 210 for calculating a distance to a stop line that calculates a road distance between the host vehicle and a stop line. The map information-sensing result unifying unit 300a has a stop line position unifying unit 310 that unifies map information and a sensing result and a distance estimation unit 320 for estimating a distance to a stop line that estimates a distance to a stop line.

The planning/judgment unit 40 has a track planning unit 400 and a speed planning unit 410. The track planning unit 400 calculates a track on which the host vehicle travels based on information on a distance to a stop line supplied from the fusion unit 30a, and the speed planning unit 410 calculates a speed for stopping the host vehicle at the stop line 2.

In FIG. 1, 800a is data sent from the map information acquisition unit 100, 800b is data sent from the locator 110, and 800c is data sent from the host vehicle information acquisition unit 120. In FIGS. 1, 810a and 810b are data sent from the distance calculation unit 210 for calculating a distance to the stop line to the sensor 10a and the stop line position unifying unit 310.

In FIG. 1, 820a is data sent from the sensor 10a to the map information-sensing result unifying unit 300a, 830a is data sent from the map information-sensing result unifying unit 300a to the planning/judgment unit 40 and the distance estimation unit 320 for estimating a distance to a stop line, and 830b is data sent from the distance estimation unit 320 for estimating a distance to a stop line to the stop line position unifying unit 310.

In FIGS. 2, 900a to 900j are signal processing steps, and 910 is a determination processing step.

FIG. 3 illustrates a left white line 1a of a host vehicle driving lane, a right white line 1b of the host vehicle driving lane, a stop line 2, a stop line detection area 3, and an error 4a of a road distance to a map-based stop line based on the map information.

Operation of the stop line detection system according to the present embodiment and the autonomous driving method using the stop line detection system will be described with reference to FIGS. 1 to 3.

The data 800a sent from the map information acquisition unit 100 includes latitude and longitude information of stop lines registered in the map information and travel route information ahead and behind the host vehicle, the data 800b sent from the locator 110 includes latitude and longitude location of the host vehicle, orientation information, and latitude and longitude error information, and the data 800c sent from the host vehicle information acquisition unit 120 includes information such as a speed, a roll angle, a pitch angle, a yaw angle, and a steering angle of the host vehicle.

The distance calculation unit 210 for calculating a distance to the stop line calculates a road distance (map information distance) to the map-based stop line 2 and an error (error distance) 4a of the road distance to the map-based stop line 2 based on at least one of the data 800a, 800b, and 800c (signal processing step 900a). The distance calculation unit 210 for calculating a distance to the sop line corresponds to a distance calculation unit that calculates a map information distance between a host vehicle and a target feature based on map information in claim 9.

In a case where the road distance to the map-based stop line 2 is equal to or less than a predetermined determination value (YES in the determination processing step 910), the distance calculation unit 210 for calculating a distance to the stop line sends, as the data 810a, the road distance to the map-based stop line 2 and the error 4a of the road distance to the map-based stop line 2 to the sensor 10a and the map information-sensing result unifying unit 300a (signal processing steps 900b and 900c). Furthermore, in a case where the road distance to the map-based stop line 2 is equal to or less than the predetermined determination value, the distance calculation unit 210 for calculating a distance to the stop line sends, as the data 810b, a processing operation start flag to the sensor 10a and the map information-sensing result unifying unit 300a (signal processing steps 900b and 900c).

The sensor 10a starts operation of the stop line detection processing unit 130a in accordance with the data 810b including the processing operation start flag. A time at which the operation of the stop line detection processing unit 130a starts is set as a time T0 (operation start time). The stop line detection processing unit 130a of the sensor 10a limits a range of processing for detecting the stop line 2 based on positional information of the stop line 2 output from the sensor 10a or the information source 20a. The stop line detection processing unit 130a sets, as the stop line detection area 3, an area obtained by adding the error 4a of the road distance to the map-based stop line 2 to front and rear sides of the road distance to the map-based stop line 2 obtained from the data 810a (signal processing step 900d).

The error 4a varies depending on the accuracy of the data 800a, 800b, and 800c. Therefore, the stop line detection area 3 set in accordance with the error 4a is enlarged or reduced depending on the accuracy. The sensor 10a changes an area where the stop line 2 is detected based on information on accuracy of the positional information of the stop line 2 output from the sensor 10a or the information source 20a.

In FIG. 3, a length of the stop line detection area 3 in a lateral direction (road width direction) may be determined by any method. For example, in a case where the map information includes information on a host vehicle driving lane width, the length of the stop line detection area 3 in the lateral direction may be calculated according to the lane width included in the map information.

Alternatively, for example, in a case where the sensor 10a or a sensor other than the sensor 10a provided in the host vehicle has a function of detecting the host vehicle driving lane width (a function of detecting an interval between the left white line 1a and the right white line 1b of the host vehicle driving lane in FIG. 3), the length of the stop line detection area 3 in the lateral direction may be calculated in accordance with a sensing result of the lane width.

The stop line detection processing unit 130a detects the stop line 2 through sensing within the stop line detection area 3 and calculates a road distance between the host vehicle and the stop line 2 (signal processing step 900e). Then, the stop line detection processing unit 130a sends, as the data 820a, the distance (actually-measured distance) to the stop line, which is a detection result, to the stop line position unifying unit 310 (signal processing step 900f). The processes in the signal processing steps 910 to 900f corresponds to a target feature detection processing unit that, in a case where the map information distance is equal to or less than a determination value, sets a detection area for detection of the target feature based on the map information distance, detects the target feature within the detection area, and calculates an actually-measured distance between the host vehicle and the target feature in claim 9.

The stop line position unifying unit 310 starts the following operation at a time T0 in accordance with the data 810b including the processing operation start flag. The stop line position unifying unit 310 unifies the data 820a including the sensing result of the road distance to the stop line 2 and the data 810a including the road distance to the map-based stop line 2 and sends, as the data 830a, a calculated unification result of the road distance to the stop line (signal processing step 900g). The stop line position unifying unit 310 corresponds to a unification result calculation unit that unifies data of the map information distance and data of the actually-measured distance to calculate a unification result of a distance between the host vehicle and the target feature in claim 9.

To unify the two data 820a and 810a in the signal processing step 900g, it is desirable to use an αβ filter, a Kalman filter, or the like, but other methods may be used.

The data 830a is input to the road distance estimation unit 320 (signal processing step 900h) for estimating a road distance to the stop line, and the road distance estimation unit 320 for estimating a road distance to the stop line calculates an estimation result of a road distance to the stop line at a time T0+ΔT. That is, the road distance estimation unit 320 estimates a road distance to the stop line at the time (T0+ΔT), which is a time after elapse of a predetermined time from the time T0, based on the data 830a of the unification result of the road distance to the stop line 2. The road distance estimation unit 320 for estimating a road distance to the stop line corresponds to a distance estimation unit that estimates a distance between a position of the host vehicle and the target feature after elapse of a predetermined time from a time of start of operation for detecting the target feature by the target feature detection processing unit in claim 10.

The estimation result of the road distance to the stop line is sent to the stop line position unifying unit 310 as the data 830b (signal processing step 900j). At or after the time T0+ΔT, the stop line position unifying unit 310 unifies the data 820a, 810a, and 830b to calculate a unification result of the road distance to the stop line and sends the unification result as the data 830a. The time T0+ΔT is a time after elapse of a predetermined time ΔT from the time T0 at which the stop line detection processing unit 130a starts the operation for detecting the stop line 2, and ΔT is a signal processing cycle time of the fusion unit 30a. That is, the stop line position unifying unit 310 initially calculates a unification result of the road distance to the stop line by unifying the data 820a and 810a and thereafter calculates a unification result of the road distance to the stop line by unifying the data 820a, 810a, and 830b every signal processing cycle time ΔT of the fusion unit 30a.

The data 830a is sent to the planning/judgment unit 40 (signal processing step 900i). Based on the input unification result of the road distance to the stop line, the planning/judgment unit 40 causes the track planning unit 400 to calculate a track plan along which the host vehicle should travel and causes the speed planning unit 410 to calculate a speed plan.

Through the above operation, in the stop line detection system according to the present embodiment and the autonomous driving method using the stop line detection system, the stop line detection area 3 can be limited in the stop line detection processing unit 130a of the sensor 10a. This can increase a stop line detection rate. Further, since the stop line detection processing unit 130a and the stop line position unifying unit 310 operate only in a case where the distance between the host vehicle and the stop line is equal to or less than the predetermined determination value, power consumption can be reduced as compared with a case where the stop line detection processing unit 130a and the stop line position unifying unit 310 always operate.

In the stop line detection system according to the present embodiment and the autonomous driving method using the stop line detection system, the sensor 10a is preferably a camera (visible light, near infrared, far infrared) or LiDAR (Laser Imaging and Ranging), but the effects of the present invention can be obtained even in a case where the sensor 10a is a sensor of other kinds that can detect a feature such as a stop line drawn on a road surface or a stop line formed as a three-dimensional structure on a road surface.

Further, in the stop line detection system according to the present embodiment and the autonomous driving method using the stop line detection system, the stop line detection processing unit 130a is provided in the sensor 10a, but the stop line detection processing unit 130a may be provided in the fusion unit 30a. In this case, in a case where the sensor 10a is a camera, for example, image data is transmitted from the sensor 10a to the stop line detection processing unit 130a provided in the fusion unit 30a.

A proper degree of pre-processing of the image data may be selected according to a signal processing capacity of the sensor 10a, a signal processing capacity of the fusion unit 30a, and a capacity of a communication unit connecting the sensor 10a and the fusion unit 30a.

Furthermore, for example, error information of the latitude and longitude of location of the host vehicle according to a satellite positioning reception status in the locator 110 is desirably used as a standard for calculation of the error 4a, but the error 4a may be calculated by other means. It is desirable that the error 4a be time-variable according to the error information of the latitude and longitude of location of the host vehicle, but the error 4a may be a fixed value.

According to the recognition device according to the present embodiment, the data 800a, 800b, and 800c are sent from the information source 20a to the map information processing calculation unit 200a of the fusion unit 30a. The map information processing calculation unit 200a of the fusion unit 30a processes the map information based on the data 800a, 800b, and 800c, and causes the distance calculation unit 210 for calculating a distance to the stop line to calculate a road distance (map information distance) to the map-based stop line 2 and the error (error distance) 4a of the road distance to the map-based stop line 2. In a case where the road distance to the map-based stop line 2 is equal to or less than a predetermined determination value, the map information processing calculation unit 200a sends, as the data 810a, the road distance to the map-based stop line and the error 4a of the road distance to the map-based stop line to the sensor 10a. Furthermore, in a case where the distance to the map-based stop line is equal to or less than the predetermined determination value, the map information processing calculation unit 200a sends the data 810b of the processing operation start flag to the sensor 10a.

The sensor 10a starts the operation of the stop line detection processing unit 130a in accordance with the processing operation start flag, performs sensing within the detection area, detects the stop line, and calculates a road distance from the host vehicle to the stop line. The stop line detection processing unit 130a sets, as the stop line detection area 3, an area obtained by adding the error 4a of the road distance to the map-based stop line to front and rear sides of the road distance to the map-based stop line, and performs sensing within the stop line detection area. Then, the stop line detection processing unit 130a calculates a measured distance between the host vehicle and the stop line detected by the sensing and sends, as the data 820a, the measured distance to the map information-sensing result unifying unit 300a of the fusion unit 30a.

In the map information-sensing result unifying unit 300a, the stop line position unifying unit 310 calculates a unification result by unifying data of the road distance to the map-based stop line and data of the road distance to the stop line actually measured by the sensing. The data 830a of the unification result is input to the distance estimation unit 320 for estimating a distance to the stop line, and the distance estimation unit 320 for estimating a distance to the stop line estimates a distance to the stop line after elapse of a signal processing cycle time ΔT from the operation start time T0 of the stop line detection processing unit 130a. The distance estimated by the distance estimation unit 320 for estimating a distance to the stop line is sent to the stop line position unifying unit 310 as the data 830b. The stop line position unifying unit 310 unifies the data 810a, 820a, and 830b, and sends data of the distance to the stop line, which is a unification result, to the planning/judgment unit 40.

According to the recognition device according to the present embodiment, a unification result of a distance between a host vehicle and a stop line is calculated by unifying data of a road distance to a map-based stop line and data of a road distance to the stop line actually measured by sensing, and the unification result is sent to the planning/judgment unit 40, and therefore even if any one of the data of the road distance to the map-based stop line and the data of the road distance to the stop line actually measured by sensing is unavailable, data can be sent to the planning/judgment unit 40, and the host vehicle can be stopped at a position of the stop line. Since the stop line detection area 3 can be limited in the stop line detection processing unit 130a of the sensor 10a, a detection rate of the stop line 2 by the sensor 10a can be increased. Further, since the stop line detection processing unit 130a operates only in a case where the distance between the host vehicle and the stop line is equal to or less than a predetermined determination value, power consumption can be reduced as compared with a case where the stop line detection processing unit 130a always operates.

Second Embodiment

Figure 4:
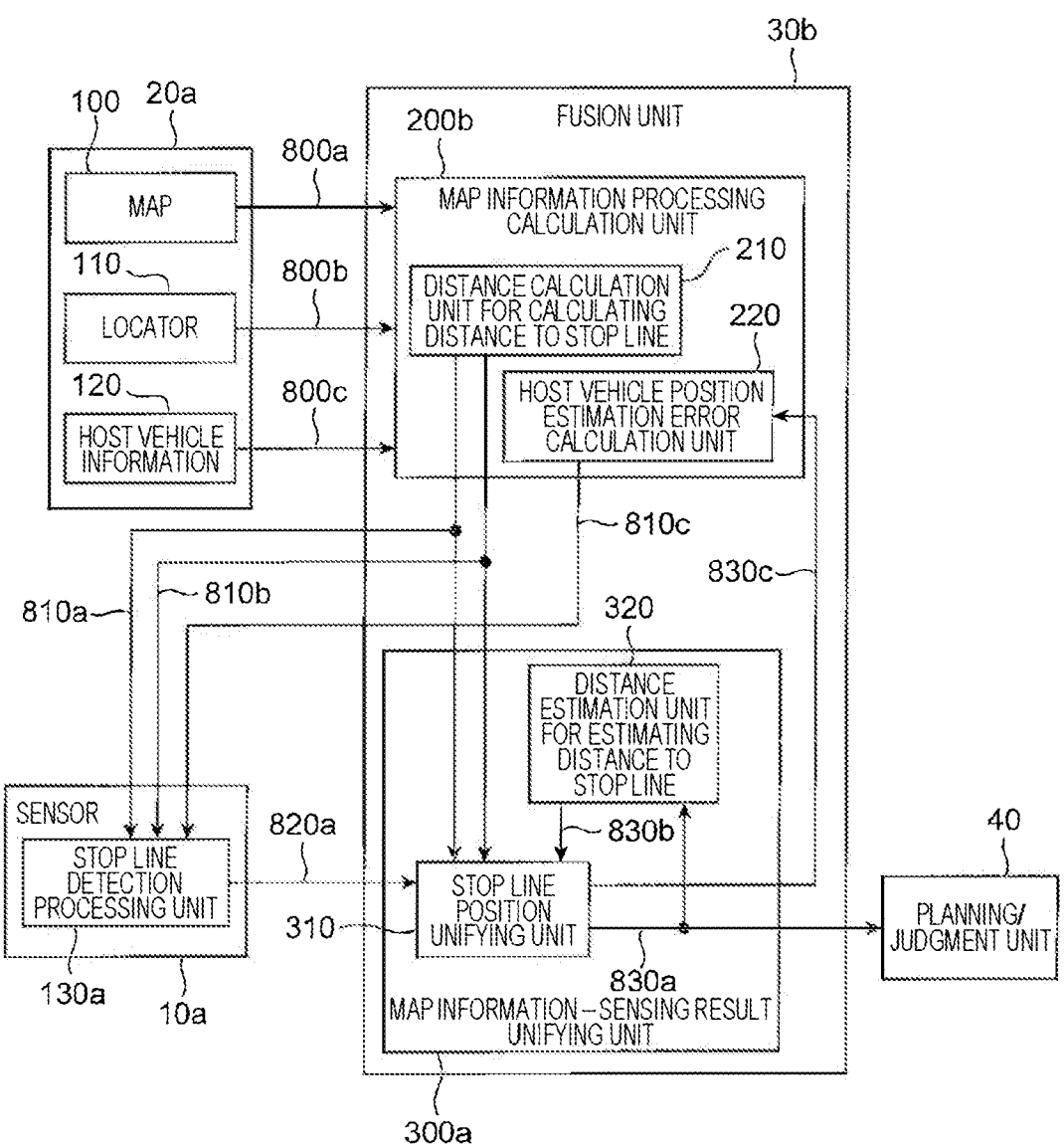
FIG. 4 is a functional block diagram of a stop line detection system and an autonomous driving method using the stop line detection system.

FIG. 4 is a functional block diagram of a stop line detection system according to the second embodiment and an autonomous driving method using the stop line detection system. Operation of the stop line detection system according to the second embodiment and the autonomous driving method using the stop line detection system will be described with reference to FIG. 4. Constituent elements similar to those in the first embodiment are given identical reference signs, and detailed description thereof is omitted.

A feature of the present embodiment lies in that a map information processing calculation unit 200b has a host vehicle position estimation error calculation unit 220 and is thus configured to narrow a stop line detection area by reducing an error distance of a road distance to a map-based stop line as the host vehicle approaches the stop line and the road distance becomes shorter.

In FIG. 4, 30b is a second fusion unit, and 200b is a map information processing calculation unit. In FIG. 4, 220 is a host vehicle position estimation error calculation unit, which is included in the map information processing calculation unit 200b. In FIG. 4, 810c is data sent from the host vehicle position estimation error calculation unit 220, and 830c is data sent from a stop line position unifying unit 310.

The host vehicle position estimation error calculation unit 220 calculates an error 4b of a road distance to a map-based stop line at a time T0 based on error information of latitude and longitude of location of the host vehicle included in data 800b sent from a locator 110 and sends, as the data 810c, the error 4b to a stop line detection processing unit 130a of a sensor 10a.

The stop line detection processing unit 130a provided in the sensor 10a limits a stop line detection area 3 by using the error 4b of the road distance to the map-based stop line in the data 810c.

The stop line position unifying unit 310 performs operation similar to that in the first embodiment and calculates a unification error obtained in unification of the two data 820a and 810a and sends the unification error as the data 830c at a time T0+ΔT. For example, in a case where a Kalman filter is used, a size of an error ellipse can be used as the unification error.

The data 830c is sent to the host vehicle position estimation error calculation unit 220, is unified with error information of the latitude and longitude of location of the host vehicle at the time T0+ΔT by the host vehicle position estimation error calculation unit 220, is calculated as the error 4b of the road distance to the map-based stop line at the time T0+ΔT, and is further sent as the data 810c to the stop line detection processing unit 130a provided in the sensor 10a.

Through the above operation, in the stop line detection system according to the second embodiment and the autonomous driving method using the stop line detection system, the error 4b of the road distance to the map-based stop line becomes smaller with passage of time, and the stop line detection area 3 becomes smaller accordingly. This can increase a stop line detection rate as compared with the first embodiment.

Third Embodiment

Figure 5:
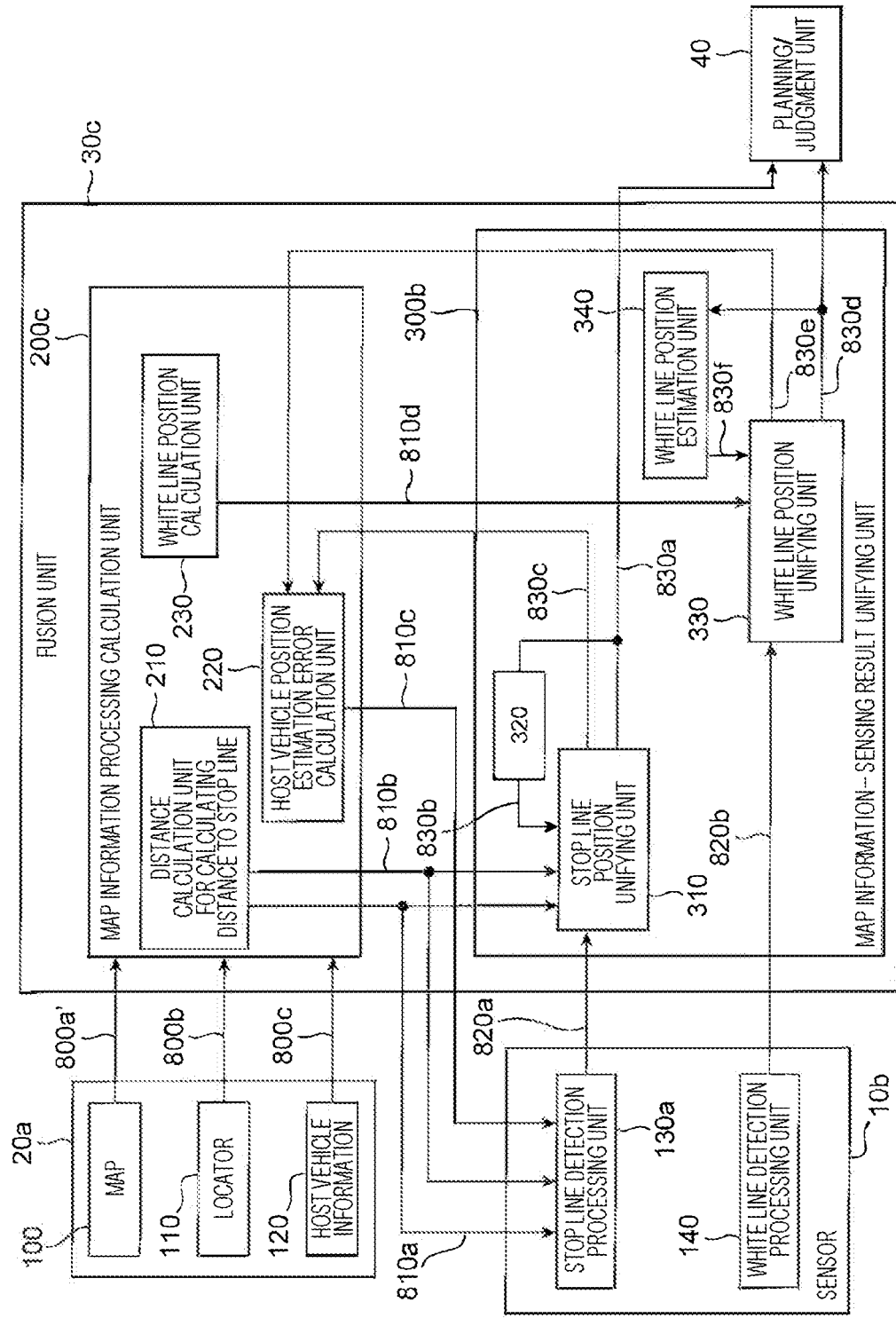
FIG. 5 is a functional block diagram of a stop line detection system and an autonomous driving method using the stop line detection system.

FIG. 5 is a functional block diagram of a stop line detection system according to the third embodiment and an autonomous driving method using the stop line detection system. Operation of the stop line detection system according to the third embodiment and the autonomous driving method using the stop line detection system will be described with reference to FIG. 5. Constituent elements similar to those in the first embodiment are given identical reference signs, and detailed description thereof is omitted.

In FIG. 5, 10b is a second sensor, 30c is a third fusion unit, 200c is a map information processing calculation unit, and 300b is a map information-sensing result unifying unit. In FIG. 5, 140 is a white line detection processing unit, which is included in the second sensor 10b. The map information processing calculation unit 200c has a distance calculation unit 210 for calculating a distance to a stop line, a host vehicle position estimation error calculation unit 220, and a white line position calculation unit 230.

In FIG. 5, 330 is a white line position unifying unit, 340 is a white line position estimation unit, the white line position unifying unit 330 and the white line position estimation unit 340 are included in the map information-sensing result unifying unit 300b. In FIG. 5, 800a' is data sent from a map information acquisition unit 100, 810d is data sent from the white line position calculation unit 230, 820b is data sent from the white line detection processing unit 140, 830d and 830e are data sent from the white line position unifying unit 330, and 830f is data sent from the white line position estimation unit 340.

In the stop line detection system according to the third embodiment and the autonomous driving method using the stop line detection system, the data 800a' has at least latitude and longitude information, curvature information, and gradient information of a left white line 1a and a right white line 1b of a host vehicle traveling lane in addition to the information described in the first embodiment and the second embodiment.

Based on the data 800a', 800b, and 800c, the white line position calculation unit 230 calculates at least map-based positions of the left white line 1a and the right white line 1b of the host vehicle traveling lane from a host vehicle and send the positions as the data 810d.

The white line detection processing unit 140 provided in the sensor 10b detects at least positions of the left white line 1a and the right white line 1b of the host vehicle traveling lane and calculates at least sensing results of the positions of the left white line and the right white line of the host vehicle traveling lane.

Further, the sensing results of the positions of the left white line and the right white line of the host vehicle traveling lane are sent to the white line position unifying unit 330 as the data 820b.

The white line position unifying unit 330 unifies the data 820b including the sensing results of the positions of the left white line and the right white line of the host vehicle traveling lane and the data 810d including the map-based positions of the left white line and the right white line of the host vehicle traveling lane to calculate a unification result of the position of the left white line and a unification result of the position of the right white line of the host vehicle traveling lane, and sends the unification results as the data 830d. To unify the two data 820b and 810d, it is desirable to use an αβ filter or a Kalman filter, but other methods may be used.

The data 830d is input to the white line position estimation unit 340, and the white line position estimation unit 340 calculates an estimation result of the position of the left white line of the host vehicle traveling lane and an estimation result of the position of the right white line of the host vehicle traveling lane at a time T0+ΔT. The estimation result of the position of the left white line of the host vehicle traveling lane and the estimation result of the position of the right white line of the host vehicle traveling lane are sent to the white line position unifying unit 330 as the data 830f. Therefore, the white line position unifying unit 330 unifies the data 820b, 810d, and 830f at or after the time T0+ΔT to calculate a unification result of the position of the left white line of the host vehicle traveling lane and a unification result of the position of the right white line of the host vehicle traveling lane and sends the unification results as the data 830d.

Concurrently with the above operation, the white line position unifying unit 330 calculates a unification error obtained in unification of the two data 820b and 810d and sends the unification error as the data 830e at the time T0+ΔT. For example, in a case where a Kalman filter is used, a size of an error ellipse can be used as the unification error.

The data 830e is sent to the host vehicle position estimation error calculation unit 220, is unified with error information of the latitude and longitude of location of the host vehicle at the time T0+ΔT by the host vehicle position estimation error calculation unit 220, is calculated as an error 4c of a road distance to the map-based stop line at the time T0+ΔT, and is sent as data 810c to the stop line detection processing unit 130a provided in the second sensor 10b.

Through the above operation, in the stop line detection system according to the present embodiment and the autonomous driving method using the stop line detection system, the error 4c of the road distance to the map-based stop line becomes smaller with passage of time, and the error 4c can be corrected based on a result of comparison between the sensing results of the positions of the left white line and the right white line of the host vehicle traveling lane and the map-based positions of the left white line and the right white line of the host vehicle traveling lane. Therefore, the error 4c of the road distance to the stop line is smaller than that in the first embodiment and the second embodiment. Accordingly, the stop line detection area 3 is further reduced. This increases a rate of detection of the stop line 2 as compared with the first embodiment and the second embodiment.

In the stop line detection system according to the present embodiment and the autonomous driving method using the stop line detection system, the positions of the left white line and the right white line of the host vehicle traveling lane are used as an example of a second feature, but the second feature may be a pedestrian crossing, a road surface marker such as a pedestrian crossing notice marker, a three-dimensional object on a road such as a sign, a signboard, a traffic light, a median, or a guardrail, or feature points of a building or a construction.

Further, in the stop line detection system according to the present embodiment and the autonomous driving method using the stop line detection system, the white line detection processing unit 140 is provided in the second sensor 10b, but the stop line detection processing unit 130a may be provided in the third fusion unit 30c.

Fourth Embodiment

Figure 6:
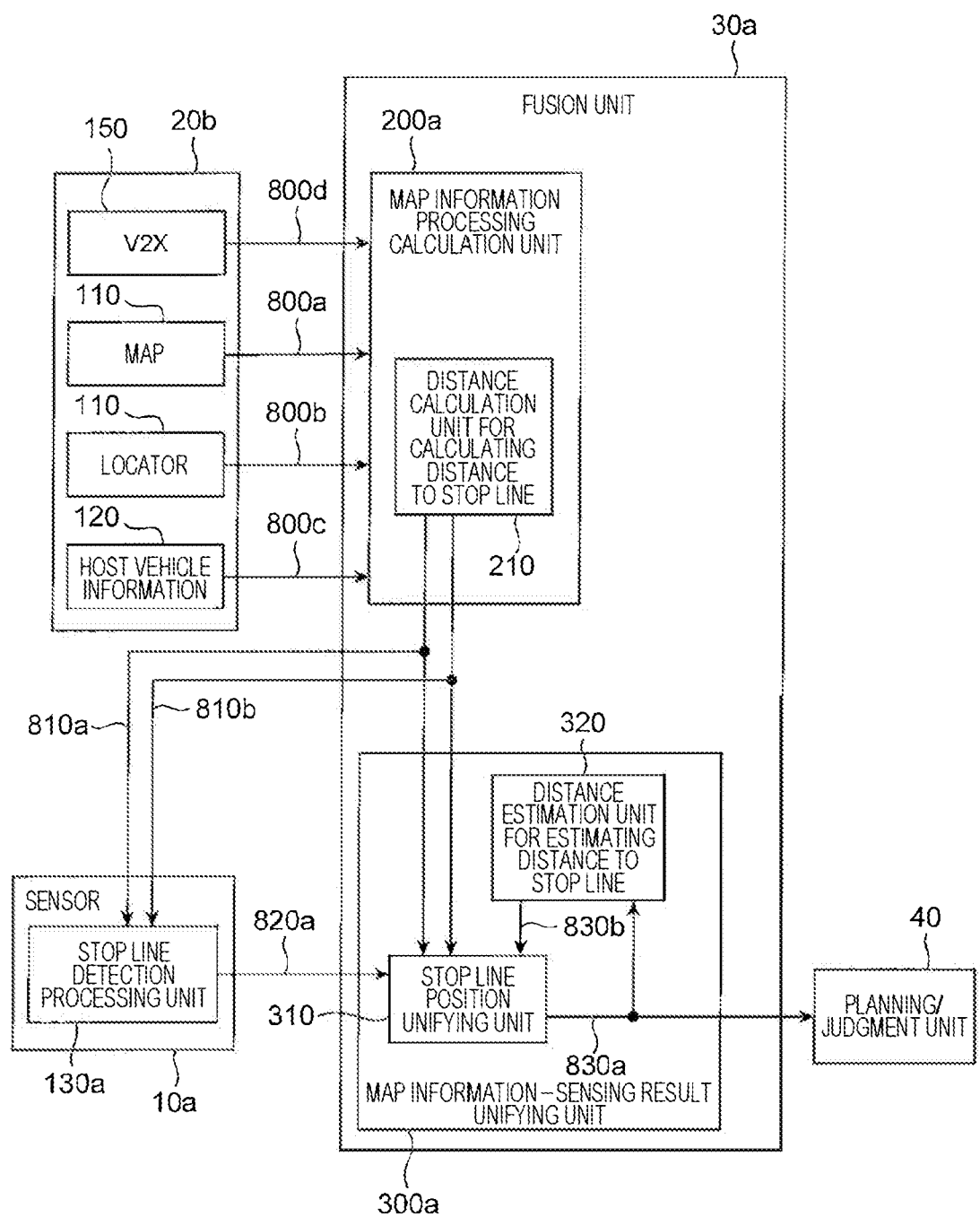
FIG. 6 is a functional block diagram of a stop line detection system and an autonomous driving method using the stop line detection system.

FIG. 6 is a functional block diagram of a stop line detection system according to the fourth embodiment and an autonomous driving method using the stop line detection system. Operation of the stop line detection system according to the present embodiment and the autonomous driving method using the stop line detection system will be described with reference to FIG. 6. Constituent elements similar to those in the above embodiments are given identical reference signs, and detailed description thereof is omitted.

In FIG. 6, 20b is a second information source, 150 is V2X (e.g., vehicle-to-vehicle communication, road-to-vehicle communication, cloud-to-vehicle communication), and 800d is data sent from the V2X.

The data 800d sent from the V2X 150 includes at least latitude and longitude information of a stop line detected by a vehicle other than a host vehicle. A distance calculation unit 210 for calculating a distance to a stop line calculates a road distance to a map-based stop line and an error 4d of the road distance to the map-based stop line based on the data 800a to 800d.

Through the above operation, the stop line detection system according to the present embodiment and the autonomous driving method using the stop line detection system can calculate a road distance to a map-based stop line more accurately than the above embodiments, for example, in a case where an error of generated latitude and longitude information of a stop line registered in map information of the data 800a sent from a map information acquisition unit 100 is large, in a case where the latitude and longitude information has not been updated, or in a case where deviation occurs due to a crustal change such as an earthquake. This assures limiting accuracy of a stop line detection area 3 generated by a stop line detection processing unit 130a, thereby increasing robustness of improvement of a stop line detection rate as compared with the above embodiments.

Fifth Embodiment

Figure 7:
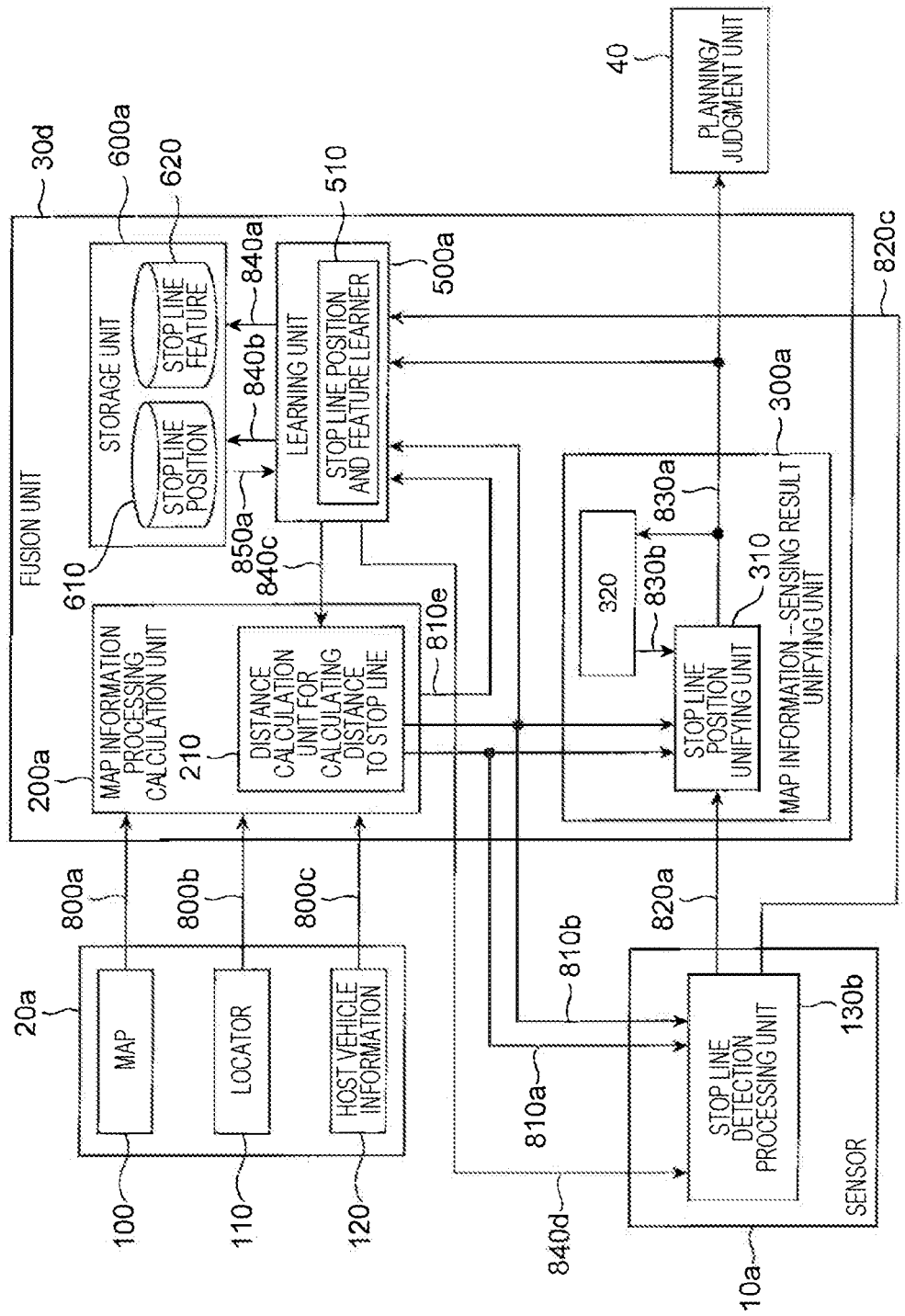
FIG. 7 is a functional block diagram of a stop line detection system and an autonomous driving method using the stop line detection system.

FIG. 7 is a functional block diagram of a stop line detection system according to the fifth embodiment and an autonomous driving method using the stop line detection system. Operation of the stop line detection system according to the present embodiment and the autonomous driving method using the stop line detection system will be described with reference to FIG. 7. Constituent elements similar to those in the above embodiments are given identical reference signs, and detailed description thereof is omitted.

In FIG. 7, 30d is a fourth fusion unit, 130b is a stop line detection processing unit provided in a sensor 10a, 500a is a learning unit, 600a is a storage unit, and the learning unit 500a and the storage unit 600a are included in the fourth fusion section 30d.

Further, 510 is a stop line position and feature learner, 610 is a stop line position storage area, and 620 is a stop line feature storage area, and the stop line position and feature learner 510 is included in the learning unit 500a, and the stop line position storage area 610 and the stop line feature storage area 620 are included in the storage unit 600a.

In FIG. 7, 810e is data sent from a map information processing calculation unit 200a, 820c is data sent from the stop line detection processing unit 130b, 840a to 840d are data sent from the learning unit 500a, and 850a is data sent from the storage unit 600a.

The stop line detection processing unit 130b provided in the sensor 10a extracts features of a detected stop line in addition to data 820a including a sensing result of a road distance to the stop line described in the above embodiments and sends the data 820c including the features of the stop line. The features of the stop line include at least a length of the stop line and a degree of fading.

In a case where a host vehicle approaches a certain stop line 2 for the first time, the learning unit 500a starts the following operation in accordance with data 810b including a processing operation start flag. Based on the data 820c and data 830a including a unification result of a road distance to the stop line sent from a stop line position unifying unit 310, the stop line position and feature learner 510 learns a position and features of the stop line and send the position and features of the stop line to the storage unit 600a as the data 840a. The data 840a input to the storage unit 600a is stored in the stop line position storage area 610 and the stop line feature storage area 620.

In a case where the host vehicle approaches the stop line 2 next time and thereafter, the map information processing calculation unit 200a sends the data 810b including the processing operation start flag and the data 810e including the positional information of the stop line 2 to the learning unit 500a. Based on the data 810e, the learning unit 500a sends an inquiry about the position and the features regarding the stop line 2 to the storage unit 600a as the data 840b.

In accordance with the data 840b, the storage unit 600a searches the stop line position storage area 610 and the stop line feature storage area 620 for the position and features regarding the stop line 2 and sends the position and features regarding the stop line 2 to the learning unit 500a as the data 850a. Based on the data 850a including the position and features regarding the stop line 2 acquired from the storage unit 600a, the learning unit 500a sends the stored information of the position regarding the stop line 2 as the data 840c to a distance calculation unit 210 for calculating a distance to a stop line and sends the stored information of the features regarding the stop line 2 as the data 840*d* to the stop line detection processing unit 130*b*.

The distance calculation unit 210 for calculating a distance to the stop line unifies data 800*a* to 800*c* sent from an information source 20*a* and the data 840*c*, calculates a road distance to a map-based stop line and an error 4*e* of the road distance to the map-based stop line, and sends the road distance to the map-based stop line and the error 4*e* of the road distance to the map-based stop line to the stop line detection processing unit 130*b* as the data 810*a*.

The stop line detection processing unit 130*b* generates a stop line detection area 3 based on the data 810*a* including the road distance to the map-based stop line and the error 4*e* of the road distance to the map-based stop line sent from the distance calculation unit 210 for calculating a distance to the stop line. Concurrently, the stop line detection processing unit 130*b* detects the stop line 2 in the stop line detection area 3 based on the data 840*d* including the stored information of the stop line features sent from the learning unit 500*a*. Further, the stop line detection processing unit 130*b* extracts features of the detected stop line and sends the data 820*c* including the features of the stop line in addition to the data 820*a* including a sensing result of the road distance to the stop line.

Based on the data 820*c* and the data 830*a* including the unification result of the road distance to the stop line sent from the stop line position unifying unit 310, the learning unit 500*a* causes the stop line position and feature learner 510 to learn a position and features of the stop line and send the position and features of the stop line to the storage unit 600*a* as the data 840*a*. The data 840*a* input to the storage unit 600*a* is stored in the stop line position storage area 610 and the stop line feature storage area 620.

Through the above operation, in the stop line detection system according to the present embodiment and the autonomous driving method using the stop line detection system, the error 4*e* of the road distance to the map-based stop line becomes smaller with passage of time and in accordance with the number of times the host vehicle passes the stop line, and the stop line detection area 3 is reduced accordingly. This can increase a stop line detection rate as compared with the above embodiments. Further, since stop line detection performance is improved by using stored information of stop line features, a stop line detection rate can be increased as compared with the above embodiments.

Note that in a case where stored information of stop line features acquired by a vehicle other than a host vehicle is acquired by using the V2X 150 described in the fourth embodiment for the stop line detection system according to the present embodiment and the autonomous driving method using the stop line detection system, efficiency of learning of stop line features is further increased, and a stop line detection rate can be increased as compared with the first to fourth embodiments.

Sixth Embodiment

Figure 8:
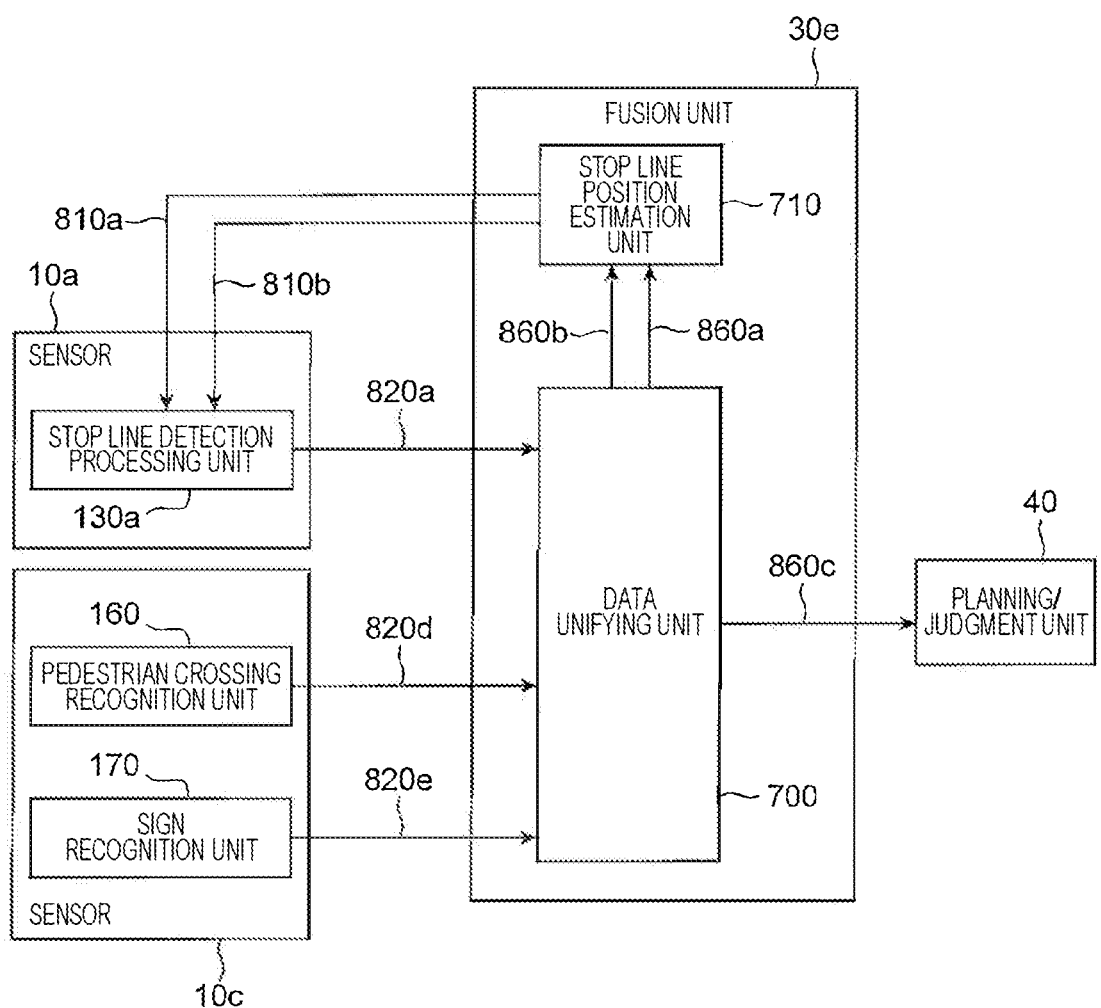
FIG. 8 is a functional block diagram of a stop line detection system and an autonomous driving method using the stop line detection system.

FIG. 8 is a functional block diagram of a stop line detection system according to the present embodiment and an autonomous driving method using the stop line detection system. Operation of the stop line detection system according to the present embodiment and the autonomous driving method using the stop line detection system will be described with reference to FIG. 8. Constituent elements similar to those in the above embodiments are given identical reference signs, and detailed description thereof is omitted.

In FIG. 8, 10*c* is a third sensor, and 30*e* is a fifth fusion unit. In FIG. 8, 160 is a pedestrian crossing recognition unit, 170 is a sign recognition unit, and the pedestrian crossing recognition unit 160 and the sign recognition unit 170 are provided in the third sensor 10*c*.

In FIG. 8, 700 is a data unifying unit, 710 is a stop line position estimation unit, and the data unifying unit 700 and the stop line position estimation unit 710 are included in the fifth fusion unit 30*e*. In FIG. 8, 820*d* is data sent from the pedestrian crossing recognition unit 160, 820*e* is data sent from the sign recognition unit 170, and data 860*a* to 860*c* are data sent from the data unifying unit 700.

When the pedestrian crossing recognition unit 160 included in the third sensor 10*c* recognizes a pedestrian crossing ahead on a host vehicle traveling lane, the pedestrian crossing recognition unit 160 calculates a distance L1 to an end of the pedestrian crossing closer to the host vehicle and sends the distance L1 to the data unifying unit 700 as the data 820*d*. Further, when the sign recognition unit 170 included in the third sensor 10*c* recognizes a sign ahead of the host vehicle, the sign recognition unit 170 calculates a type of the sign and a distance L2 to the sign and sends the type and the distance L2 to the data unifying unit 700 as the data 820*e*.

In a case where the distance L1 to the end of the pedestrian crossing closer to the host vehicle included in the data 820*d* becomes equal to or less than a predetermined determination value, the data unifying unit 700 sends a detection operation start flag and the distance L1 to the end of the pedestrian crossing closer to the host vehicle to the stop line position estimation unit 710 as the data 860*a*.

The stop line position estimation unit 710 starts the following operation in accordance with the detection operation start flag included in the data 860*a*. The stop line position estimation unit 710 calculates an estimated distance L1−ΔL to the stop line by subtracting a predetermined distance ΔL between an end of a pedestrian crossing closer to the host vehicle and a stop line from the distance L1 to the end of the pedestrian crossing closer to the host vehicle included in the data 860*a*. Concurrently, the stop line position estimation unit 710 calculates an error 4*f* of the estimated distance to the stop line.

The error 4*f* of the estimated distance to the stop line is desirably a value obtained by adding a predetermined variation of the distance ΔL between a pedestrian crossing and a stop line to a predetermined error according to detection accuracy of the sensor 10*a* and the third sensor 10*c*. Further, the stop line position estimation unit 710 sends the estimated distance L1−ΔL to the stop line and the error 4*f* of the estimated distance to the stop line to a stop line detection processing unit 130*a* as data 810*a* and concurrently sends a detection operation start flag to the stop line detection processing unit 130*a* as data 810*b*.

Meanwhile, in a case where the type of the sign included in the data 820*e* is "stop" and the distance L2 to the sign included in the data 820*e* is equal to or less than a predetermined determination value, the data unifying unit 700 sends an operation start flag and the distance L2 to the sign to the stop line position estimation unit 710 as the data 860*b*.

The stop line position estimation unit 710 starts the following operation in accordance with the detection operation start flag included in the data 860*b*. The stop line position estimation unit 710 calculates an estimated distance L3 to a stop line from the distance L2 to the sign included in the data 860*a*. The distance L2 to the sign and the estimated distance L3 to the stop line may be equal to each other.

Concurrently, the stop line position estimation unit 710 calculates an error 4f of the estimated distance to the stop line. The error 4f of the estimated distance to the stop line is desirably a predetermined error according to detection accuracy of the first sensor 10a and the third sensor 10c. Further, the stop line position estimation unit 710 sends the estimated distance L3 to the stop line and the error 4f of the estimated distance to the stop line to the stop line detection processing unit 130a as the data 810a and concurrently sends a detection operation start flag to the stop line detection processing unit 130a as the data 810b.

Note that the stop line position estimation unit 710 starts operation in accordance with the detection operation start flag included in the data 860a OR the detection operation start flag included in the data 860b. Further, in the operation of the stop line detection processing unit 130a, a range of the stop line detection area 3 is a logical disjunction (OR) or a logical conjunction (AND) of a range limited based on the estimated distance L1−ΔL to the stop line and the error 4f of the estimated distance to the stop line and a range limited based on the estimated distance L3 to the stop line and the error 4f of the estimated distance to the stop line.

The logical disjunction (OR) is desirable to increase a rate of inclusion of the stop line in the stop line detection area 3 by expanding the range of the stop line detection area 3. Meanwhile, the logical conjunction (AND) is desirable to increase a rate of detection by narrowing the range of the stop line detection area 3.

Through the above operation, in the stop line detection system according to the present embodiment and the autonomous driving method using the stop line detection system, the stop line detection area 3 can be limited in the stop line detection processing unit 130a provided in the sensor 10a even in a case where the map information acquisition unit 100 does not operate or is not provided. This can increase a stop line detection rate.

Although a pedestrian crossing and a sign are used as information for limiting the stop line detection area 3 in the stop line detection system according to the present embodiment and the autonomous driving method using the stop line detection system, a road surface marker such as a pedestrian crossing notice marker, a three-dimensional object on a road such as a signboard, a traffic light, a median, or a guardrail, or feature points of a building or a construction may be used.

Further, in the stop line detection system according to the present embodiment and the autonomous driving method using the stop line detection system, the pedestrian crossing recognition unit 160 and the sign recognition unit 170 are provided in the third sensor 10c, but the pedestrian crossing recognition unit 160 and the sign recognition unit 170 may be provided in the sensor 10a or the fifth fusion unit 30e. Furthermore, functions of the pedestrian crossing recognition unit 160 and the sign recognition unit 170 may be realized by combining one or more sensors other than the sensor 10a (first sensor) and the sensor 10c (third sensor).

Seventh Embodiment

Figure 9:
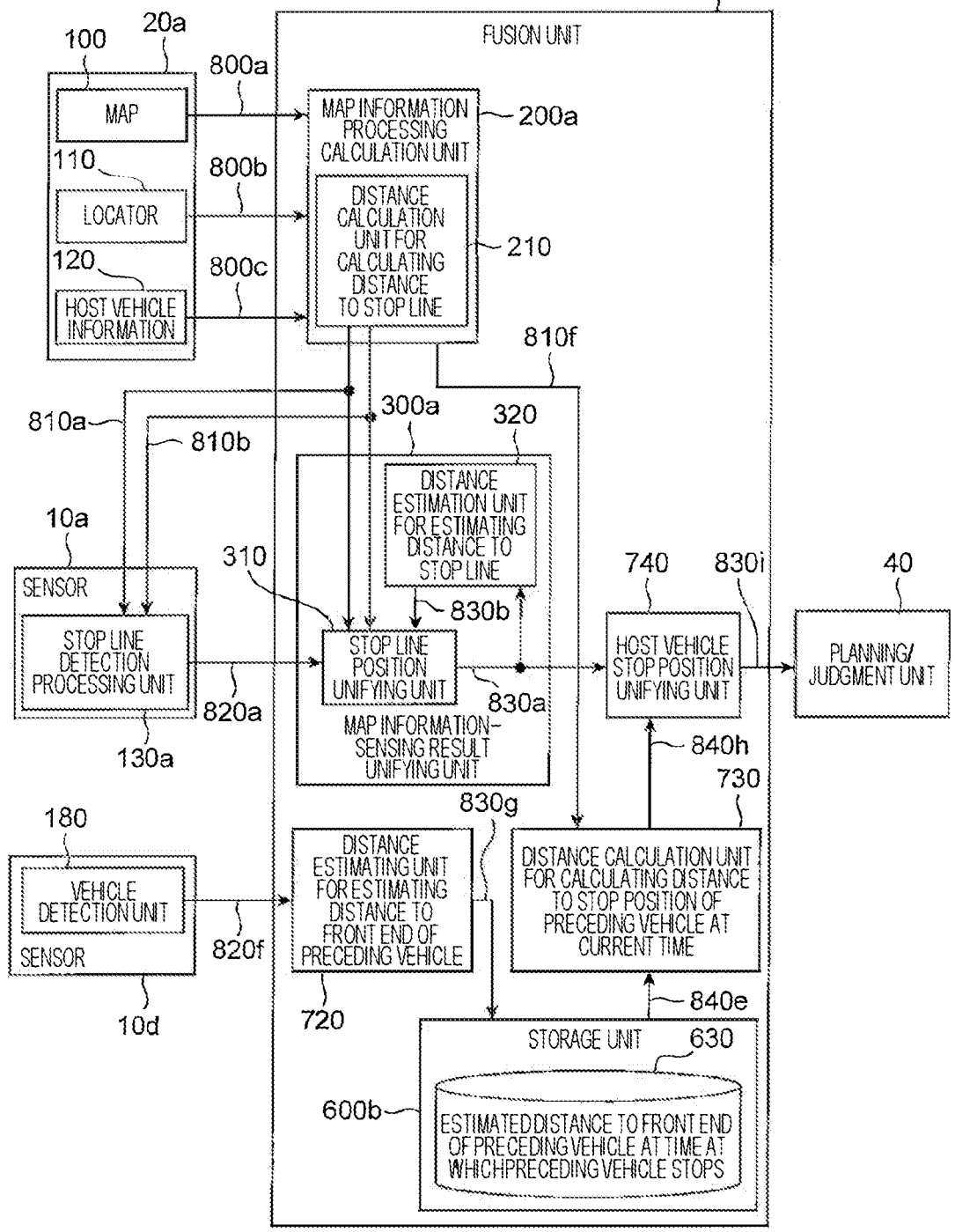
FIG. 9 is a functional block diagram of a stop line detection system and an autonomous driving method using the stop line detection system.

FIG. 9 is a functional block diagram of a stop line detection system according to the seventh embodiment and an autonomous driving method using the stop line detection system. Operation of the stop line detection system according to the present embodiment and the autonomous driving method using the stop line detection system will be described with reference to FIG. 9. Constituent elements similar to those in the above embodiments are given identical reference signs, and detailed description thereof is omitted.

In FIG. 9, 10d is a fourth sensor, and 30f is a sixth fusion unit. In FIG. 9, 180 is a vehicle detection unit, and the vehicle detection unit 180 is provided in the fourth sensor 10d. In FIG. 9, 600b is a storage unit, 630 is an estimated distance storage region in which an estimated distance to a front end of a preceding vehicle at a time when the preceding vehicle stops is stored, and the estimated distance storage region 630 is included in the storage unit 600b.

In FIG. 9, 720 is a distance estimation unit that estimates a distance to the front end of the preceding vehicle, 730 is a distance calculation unit that calculates a distance to a position where the preceding vehicle has been stopped at a current time, and 740 is a host vehicle stop position unifying unit. In FIG. 9, 820f is data sent from the vehicle detection unit 180, 830g is data sent from the distance estimation unit 720 for estimating a distance to the front end of the preceding vehicle, 830h is data sent from the distance calculation unit 730 for estimating a distance to the position at which the preceding vehicle has stopped at the current time, 830i is data sent from the host vehicle stop position unifying unit 740, and 840e is data sent from the storage unit 600b.

The vehicle detection unit 180 provided in the fourth sensor 10d detects a preceding vehicle traveling ahead on a host vehicle traveling lane, calculates speed, type, width, height, and distance to a rear end of the preceding vehicle, and sends the speed, type, width, height, and distance to the rear end of the preceding vehicle as the data 820f.

The distance estimation unit 720 for estimating a distance to the front end of the preceding vehicle estimates a length of the preceding vehicle based on the type, width, and height of the preceding vehicle included in the data 820f. Further, the distance estimation unit 720 calculates an estimated distance to a front end of the preceding vehicle by adding an estimated value of the length of the preceding vehicle to the distance to the rear end of the preceding vehicle included in the data 820f. Furthermore, the distance estimation unit 720 sends the estimated distance to the front end of the preceding vehicle and the speed of the preceding vehicle as the data 830g.

Based on the data 830g, the storage unit 600b causes a time T1 at which the preceding vehicle stops and an estimated distance L4 to the front end of the preceding vehicle at the time TI to be stored in the estimated distance storage region 630. Further, the storage unit 600b sends stored data regarding the time T1 at which the preceding vehicle stops and the estimated distance L4 to the front end of the preceding vehicle at the time TI to the distance calculation unit 730 for calculating a distance to the position at which the preceding vehicle has stopped at the current time as the data 840e.

The map information processing calculation unit 200a sends data 810f including at least a speed of the host vehicle to the distance calculation unit 730 for calculating a distance to the position at which the preceding vehicle has stopped at the current time.

The distance calculation unit 730 for calculating a distance to the position at which the preceding vehicle has stopped at the current time calculates an estimated distance L5 to a position where the preceding vehicle has been stopped at a time T2 based on the two data 810f and 840e. Specifically, the estimated distance L5 can be obtained by the following Expression (1) when the speed of the host vehicle is a constant value V between the times T1 and T2.

$$L5 = L4 - (T2 - T1) \times V \tag{1}$$

Further, the distance calculation unit 730 sends the estimated distance L5 to the position where the preceding vehicle has been stopped at the time T2 to the host vehicle stop position unifying unit 740 as the data 840h.

The host vehicle stop position unifying unit 740 unifies data 830a including a unification result of a road distance to a stop line at the time T2 and the data 840h including the estimated distance L5 to the position where the preceding vehicle has been stopped at the time T2 and sends the unified data to a planning/judgment unit 40 as the data 830i. In the unification, for example, in a case where the data 820a is not sent from a stop line detection processing unit 130a, processing for increasing a weight of the data 840h is executed.

Through the above operation, in the stop line detection system according to the present embodiment and the autonomous driving method using the stop line detection system, information for stopping the host vehicle can be calculated and sent to the planning/judgment unit 40 even in a case where a stop line ahead cannot be detected by the sensor 10a due to a preceding vehicle. This can improve safety of driving.

In the stop line detection system according to the present embodiment and the autonomous driving method using the stop line detection system, the vehicle detection unit 180 is provided in the fourth sensor 10d, but may be provided in the sensor 10a or the sixth fusion unit 30f. Further, the functions of the vehicle detection unit 180 may be realized by combining one or more sensors other than the first and fourth sensors 10a and 10d.

Eighth Embodiment

Figure 10:
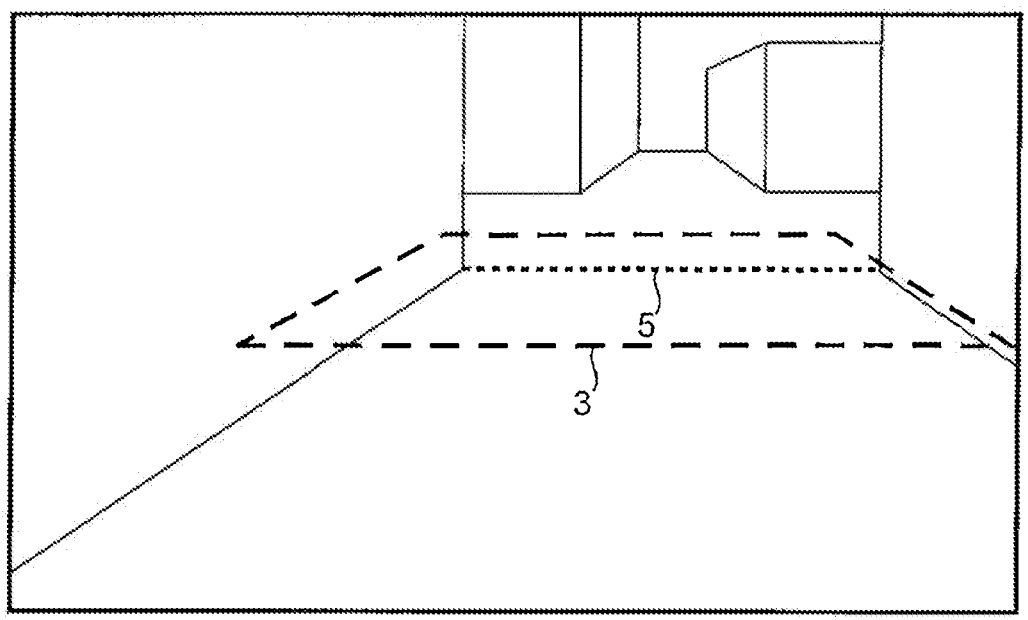
FIG. 10 illustrates a technical outline of the stop line detection system.

FIG. 10 illustrates a technical outline of a stop line detection system according to the eighth embodiment and an autonomous driving method using the stop line detection system. In FIG. 10, 5 is a virtual stop line, which is a line connecting ends, on a side closer to a host vehicle, of a lane that intersects a host vehicle driving lane at a traffic intersection.

Although a stop line actually drawn on a road surface is used as a feature in the first to seventh embodiments, the virtual stop line 5 may be used as a feature in a case where stop line detection using a sensor is difficult at a traffic intersection of poor visibility, at night, or in the rain. The feature is not limited to a stop line actually drawn on a road surface and may be a virtual stop line that is not actually drawn on a road surface.

In the stop line detection system according to the present embodiment and the autonomous driving method using the stop line detection system, information for stopping a host vehicle can be calculated and sent to a planning/judgment unit 40 even in a case where stop line detection using a sensor is difficult at a traffic intersection of poor visibility, at night, or in the rain as described above. This can improve safety of driving. The virtual stop line 5 may be calculated from stop information of other vehicles obtained from V2X 150 or from stored past stop information of the host vehicle.

In the first to eighth embodiments of the stop line detection system and the autonomous driving method using the stop line detection system, the first to fourth sensors may be any sensor such as a camera (visible light, near infrared, far infrared), LiDAR, laser radar, radio wave radar, or sonar.

In the description of the operation of the stop line detection system and the autonomous driving method using the stop line detection system according to the first to eighth embodiments, a processing delay time in the functional blocks 100 to 340 and a communication delay time between functional blocks are ignored in the operation start time of the stop line position unifying unit 310, the operation start times of the stop line detection processing units 130a and 130b, the operation start time of the learning unit 500a, and the sending times of the data 800 to 850. In an actual system, the operation start times and the data sending times may be determined in consideration of the processing delay time and the communication delay time.

Although the embodiments of the present invention have been described in detail above, the present invention is not limited to the above embodiments, and various design changes can be made without departing from the spirit of the present invention described in the claims. For example, the above embodiments have been described in detail to explain the present invention in an easy-to-understand manner and are not necessarily limited to one having all the described elements. Further, one or more of elements of one embodiment may be replaced with an element of another embodiment. Further, an element of one embodiment may be added to elements of another embodiment. Moreover, as for one or more of elements of each embodiment, addition, deletion, or substitution of another element is possible.

REFERENCE SIGNS LIST 1 white line
2 stop line
3 stop line detection area
4 error of road distance to map-based stop line
5 virtual stop line
10 sensor
20 information source
30 fusion unit
40 planning/judgment unit
100 map information acquisition unit
110 locator
120 host vehicle information acquisition unit
130 stop line detection processing unit
140 white line detection processing unit
150 V2X
160 pedestrian crossing recognition unit
170 sign recognition unit
180 vehicle detection unit
200 map information processing calculation unit
210 distance calculation unit for calculating distance to stop line
300 map information-sensing result unifying unit
310 stop line position unifying unit
400 track planning unit
410 speed planning unit
500 learning unit
510 stop line position and feature learner
520 other vehicle stop position learner
600 storage unit
610 stop line position storage region
620 stop line feature storage region
630 estimated distance storage region in which estimated distance to front end of preceding vehicle at time at which preceding vehicle stops is stored
700 data unifying unit
710 stop line position estimation unit
720 distance estimation unit for estimating distance to front end of preceding vehicle 730 distance calculation unit for calculating distance to position at which preceding vehicle has been stopped at current time
740 host vehicle stop position unifying unit
900 signal processing step
910 determination processing step

The invention claimed is:

1. A recognition device comprising:
a first sensor that detects a first feature; and
at least one information source different from the first sensor,
wherein an operation start time of the first sensor is determined based on operation start information output from the first sensor or the information source,
distance information on a distance to the first feature sent to the first sensor is corrected based on a result of detection of positional information of a second feature and position error information of the second feature, and
a range of feature recognition processing performed by the first sensor is narrowed based on a value of the position error information of the second feature.

2. The recognition device according to claim 1, wherein the first sensor limits a range of detection of the first feature based on positional information of the first feature output from the first sensor or the information source.

3. The recognition device according to claim 1 wherein the first sensor changes an area where the first feature is detected based on accuracy information of positional information of the first feature output from the first sensor or the information source.

4. The recognition device according to claim 1, wherein the information source is information obtained through V2X on a result of feature detection performed by another vehicle.

5. The recognition device according to claim 1, wherein the information source is stored information of a feature detected by using the first sensor.

6. The recognition device according to claim 1, further comprising a function of generating host vehicle stop position information based on a result of detection of a stop position of another vehicle.

7. The recognition device according to claim 1, further comprising a function of generating host vehicle stop position information based on a virtual stop line that is not drawn on a road surface.

* * * * *